United States Patent Office 3,155,932
Patented Nov. 3, 1964

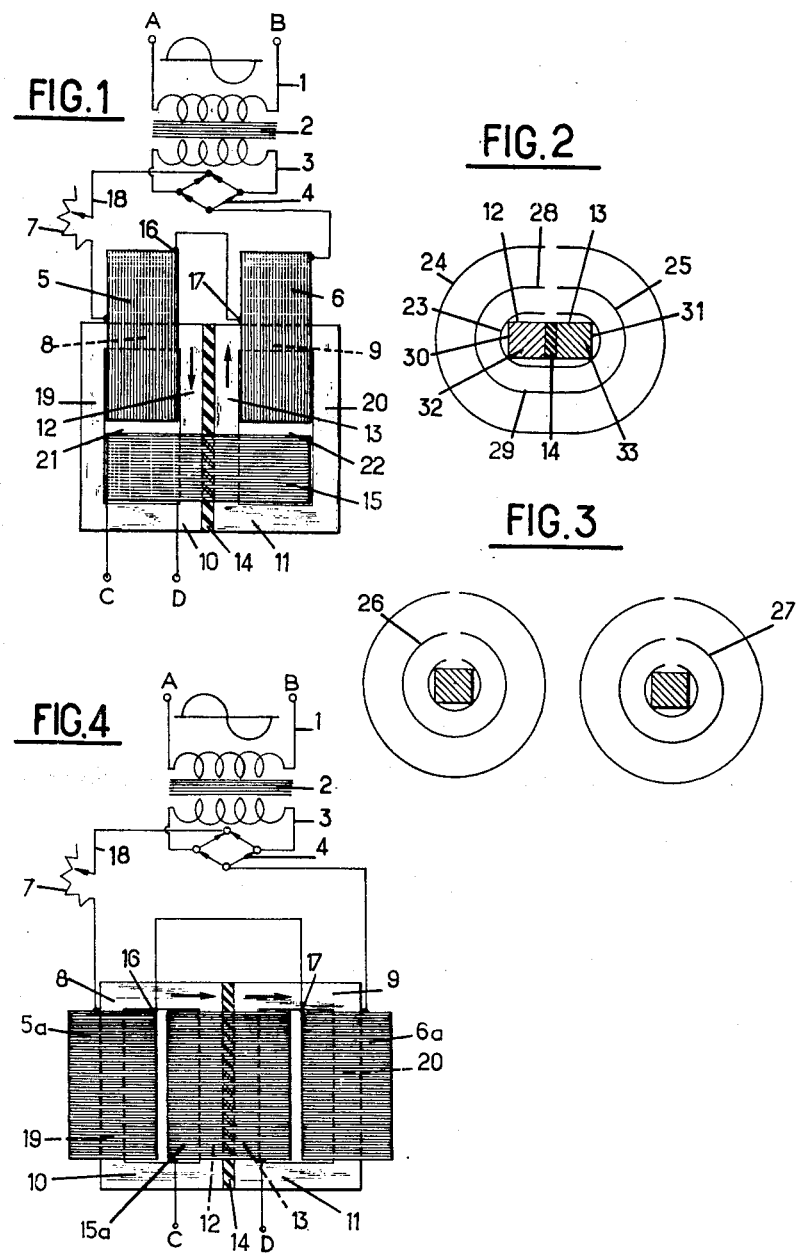

3,155,932
SATURABLE REACTOR HAVING HIGHLY VARIABLE IMPEDANCE
Edouard Oberli, 59 Blvd. Pasteur, La Courneuve, France
Filed Oct. 30, 1959, Ser. No. 849,939
Claims priority, application France, Nov. 5, 1958,
778,416, Patent 1,217,699
4 Claims. (Cl. 336—155)

It is known to regulate the power supplied to a single phase A.C. circuit, or to a D.C. circuit supplied by a transformer rectifier assembly by varying the value of an impedance inserted in the A.C. branch of the circuit.

Such regulation may be obtained by employing an inductance provided with a slideable core. The inductive drop of the alternating current transformer which supplies the circuit in question may also be regulated by varying the leakage flux of the transformer.

When dealing with circuits carrying large amounts of power, it is preferable to use a saturable reactor, the magnetic circuit of which may be more or less saturated by means of a coil supplied with direct current.

This method of regulation is particularly useful when the load circuit has a substantially constant voltage drop, as in the case of a D.C. circuit for charging a storage battery or a single phase or D.C. circuit for supplying an arc.

In the latter case the insertion of a reactance having a high impedance is desirable in order to secure a substantially constant supply for the arc.

If it is desired to substantially vary the supply to a soldering iron by acting only on the saturation of an inductance, it is necessary to provide inductances having a low ohmic resistance in proportion to their reactance. By varying the saturating currents of these inductances, one can then bring about a substantial change in their impedance.

In the saturable reactances of known types now used in single phase circuits, the coil inserted in the A.C. circuit is always divided into two parts, the two A.C. coils being wound either on the outer cores of a shielded magnetic circuit comprising three cores, which may be formed by bringing together two magnetic circuits having two cores, or on two of the cores of two similar magnetic circuits spaced a short distance from each other.

In the first case, the central core carries a saturating coil which saturates the two halves of the shielded circuit. In the second case a saturating coil is provided in each of the magnetic circuits, a coil which is preferably concentric with the A.C. coil of the same magnetic circuit.

In these two cases, the connection between the different A.C. coils on the one hand, and between the different saturation coils on the other hand, is so made as to avoid the creation of any secondary A.C. component in the saturating circuit.

In accordance with the predetermined dimensions of the magnetic circuit, the mounting of the coils may be arranged within a predetermined space, so that a maximum number of coils of sufficiently large diameter wire are provided to permit the maximum expected alternating current to pass therethrough without overheating.

Under these conditions, if it is desired to have only one A.C. winding on the central core of a shielded circuit, for example, two D.C. coils being provided on the outer cores of the magnetic circuit, it is necessary to choose between two methods of connecting these two D.C. coils, each of which presents definite disadvantages.

The first results in the creation of an A.C. component in the D.C. saturating circuit, which cannot be tolerated.

The second permits saturation of the outer cores but leads to a very low magnetic flux in the central core, that is to say, to a minimum impedance for the reactor which is near its maximum, since it corresponds to the impedance of a reactor having a right hand core equal in length to that of the central core of the magnetic circuit under consideration.

The object of the present invention is to provide a D.C. saturable reactance, the impedance of which may be widely varied, characterized by the fact that its different coils are wound on two magnetic circuits having two cores symmetrically coupled across a plate of electrical insulating material which is impermeable to magnetic flux and having a thickness of the order of 2 mm., the assembly of coupled magnetic circuits constituting a shielded circuit comprising three cores, on the composite central core of which is wound the coil of variable impedance, which is to be inserted into a single phase A.C. circuit.

The insulating plate provides adequate insulation between the coupled circuits so that the two saturating coils have independent effects in the magnetic circuits, thus producing direct currents in opposite directions in the two adjacent cores of the composite core.

The ohmic resistance of the single A.C. coil of the saturable reactor is less than that of the two separate coils having the same number of turns and occupying the same available space in the openings of the magnetic circuits.

The L/R ratio is thus improved in comparison with that in arrangements comprising two A.C. windings.

The connection between the D.C. coils may be so made as to avoid any A.C. components in the saturating circuit, while permitting the complete saturation of the two magnetic circuits.

A maximum variation in the value of the impedance Z of the reactor is thus obtained, this value being substantially equal to its ohmic resistance when the reactor is saturated to its maximum.

When the impedance of the other elements of the load circuit is negligible in proportion to that of the saturable reactor, the ratio between the maximum impedance and the minimum impedance of the latter is substantially equal to the ratio between the maximum and minimum power which it is desired to supply to the load circuit.

In the case of soldering irons the invention permits a maximum/minimum power supply ratio of 5/1.

Other characteristics of the present invention will be better understood after reading the following description of one embodiment of the invention, given purely by way of example, with reference to the accompanying drawings, in which:

FIG. 1 is a circuit diagram showing the connections of a saturable reactor according to the invention;

FIG. 2 is a schematic section through an A.C. coil wound on the composite central core formed by coupling two adjacent cores separated by an insulating sheet;

FIG. 3 is a schematic cross-section of two similar A.C. coils, wound on two cores of two magnetic circuits of the same type as those employed in the arrangement shown in FIG. 2, but not coupled; and FIG. 4 is a circuit diagram showing the connections of a second embodiment of a saturable reactor according to the invention.

FIG. 1 shows an A.C. source, which may be a power line, connected at A and B to the primary 1 of a transformer 2, the secondary 3 of which supplies direct current through the rectifier 4 connected as a Wheatstone bridge, and through the rheostat 7 which regulates the saturating current in the circuit formed by connecting the coils 5 and 6 in series. These coils are wound on the two arms of the magnetic circuits 10 and 11, the two cores 12 and 13 of which are coupled across an insulating plate 14 which is impermeable to magnetic flux.

A winding 15 designed to be connected at C and D in the A.C. portion of the circuit whose supply is to be regulated is wound on the composite core formed by the assembly of the cores 12 and 13 separated by the insulating plate 14.

As has heretofore been explained, the two coils 5 and 6 are connected in series by directly connecting the output 16 of the first coil and the input 17 of the second coil so that the saturation flux passes through the cores 12 and 13 in the opposite directions indicated by the arrows on the figure. In contrast, the alternating flux due to the passage of alternating current through the coil 15 always flows in the same direction in these two cores.

The two coupled magnetic circuits are thus saturated throughout the entire path of the magnetic lines of force, and particularly throughout the cores 12 and 13, while the two alternating components induced in the coils 5 and 6 by the alternating flux produced by the passage of the alternating current through the winding 15 have a zero resultant in the circuit 18 connected across the rectifier 4.

The arrangement represented on FIG. 4 is exactly like that of FIG. 1, with the reference numerals applied to the different elements unchanged, except for the two saturating coils which carry reference numerals 5a and 6a instead of 5 and 6, and the A.C. coil which carries reference numeral 15a instead of 15.

In this embodiment the coils 5a and 6a are not wound on the two arms 8 and 9 of the magnetic circuits 10 and 11, but on the outer cores 19 and 20 of these two magnetic circuits. Moreover, the three coils 5a, 6a and 15a extend for the entire length of the cores 19 and 20 and of the composite core constituted by the two cores 12 and 13 and the insulating plate 14. In contrast to the arrangement shown in FIG. 1, the coil 15a no longer extends all the way across both the openings in the two elementary magnetic circuits since part of these openings is filled by the windings 5a and 6a.

Since the ohmic value of the winding 15, for a given number of turns, determined by the maximum current which passes through these turns and by the space left open for that winding in the openings 21 and 22, is proportional to the length of the average of the longest and shortest turns, which may be the inner turn 23 wound immediately around the core and the outer turn 24, on the periphery of the winding, the ohmic resistance of the winding 15 of the reactor according to the invention may be compared to that of two circular coils such as those of FIG. 3, by comparing the length of the average turn 25 of FIG. 2 to the sum of the lengths of average turns 26 and 27, of the two coils of FIG. 3.

It will be seen that turn 25 has a substantially oval shape and consists of two circular portions of the same diameter as turns 26 and 27, connected to each other by the linear portions 28 and 29 equal in length to the distance between the centers 30 and 31 of the two adjacent sections 32 and 33 of the cores 12 and 13 separated by the insulating plate 14.

It will also be seen, by comparing these two figures, that the distance between points 30 and 31 is less than half the length of the average turn 26. Consequently, the ohmic resistance of the alternating current winding of the reactor per ampere turn according to the invention is reduced in proportion to the ratio between the length of the average turn 25 and the sum of the lengths of average turns 26 and 27 of FIG. 3, that is to say, a value approximately equal to ⅔ of the ohmic resistance of the coil assembly of FIG. 3.

The L/R ratio is therefore augmented in proportion to the decrease in resistance thus obtained, and has already been mentioned, the change in impedance Z of the reactor, and that in the impedance in the circuit assembly, which is brought about by changing the value of the saturating current by means of a rheostat 7, are themselves increased. It is thus possible to bring about power changes in the ratio of 5/1, which have heretofore been obtainable only by means of intermediate contacts on the transformer engaged by suitable commutating means in accordance with the power desired in the load circuit.

It should be noted that the Wheatstone bridge connection of the rectifier 4 is not an essential feature of the invention and that it is possible to saturate the magnetic circuits by means of direct current obtained by any means for rectifying the A.C. input.

It is also possible to provide a filter condenser at the terminals of the D.C. saturation coils to smooth out the residual sine wave.

It will be understood that the described embodiments may be altered as to detail, and added to, and that certain elements may be replaced by equivalent elements, without thereby departing from the spirit of my invention as defined by the following claims.

What I claim is:

1. A saturable reactor comprising two separate cores of magnetically permeable material defining a pair of closed magnetic circuits, one portion of each core running parallel to a corresponding adjacent portion of the other core and being separated therefrom by a thin layer of insulating material, said parallel adjacent core portions forming with said insulating material a composite leg having a circumference less than the sum of the individual circumferences of said parallel core portions, an alternating current coil connected in an alternating current circuit and wound about said composite leg so that its resistance per ampere turn is less than that which would prevail in two separate alternating current coils, if each were wound about only one of said parallel adjacent core portions, two separate direct current saturating coils, one wound about a portion of each of said cores other than said parallel adjacent portions, said saturating coils being connected in series and so wound on said cores as to induce oppositely directed magnetic flux in said parallel adjacent portions, and means supplying direct current to said direct current coils.

2. A saturable reactor as claimed in claim 1 in which each of said cores encircles a central opening, and comprises a portion normal to said adjacent parallel portions, said saturating coils being wound about said normal portions and said alternating current coil extending laterally across said openings.

3. A saturable reactor as claimed in claim 1 in which each of said cores encircles a central opening, and comprises a leg parallel to but laterally spaced from said parallel adjacent portions, said saturating coils being wound about said legs, said alternating current coil extending for the entire length of said parallel adjacent portions but occupying only a portion of said central openings.

4. A saturable reactor as claimed in claim 1 in which said layer of insulating material is approximately 2 mm. thick.

References Cited in the file of this patent

UNITED STATES PATENTS

| 1,227,302 | Osnos | May 22, 1917 |
| 1,779,269 | Clough | Oct. 21, 1950 |
| 2,911,586 | Zelina | Nov. 3, 1959 |
| 2,932,787 | Krabbe et al. | Apr. 12, 1960 |

FOREIGN PATENTS

| 472,521 | Great Britain | Sept. 24, 1937 |